US008547447B2

(12) United States Patent
Imai (10) Patent No.: US 8,547,447 B2
(45) Date of Patent: Oct. 1, 2013

(54) IMAGE SENSOR COMPENSATION (75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 13/029,076

(22) Filed: Feb. 16, 2011

(65) Prior Publication Data

US 2012/0206631 A1 Aug. 16, 2012

(51) Int. Cl.
*H04N 5/228* (2006.01)

(52) U.S. Cl.
USPC ...................................... 348/222.1

(58) Field of Classification Search
USPC ...................................... 348/222.1
See application file for complete search history.

(56) References Cited

U.S. PATENT DOCUMENTS

| | | | |
|---|---|---|---|
| 6,226,034 B1 | 5/2001 | Katayama | |
| 6,369,901 B1 * | 4/2002 | Buhr et al. | 358/1.1 |
| 6,377,300 B1 * | 4/2002 | Morris et al. | 348/207.99 |
| 7,321,388 B2 | 1/2008 | Safai | |
| 7,330,209 B2 | 2/2008 | Osamato | |
| 7,652,699 B2 | 1/2010 | He et al. | |
| 8,130,292 B2 * | 3/2012 | Lee | 348/251 |
| 2005/0007460 A1 * | 1/2005 | Stavely et al. | 348/222.1 |
| 2007/0236757 A1 | 10/2007 | Stewart et al. | |
| 2008/0259186 A1 * | 10/2008 | Wang et al. | 348/238 |
| 2009/0218495 A1 * | 9/2009 | Leroux et al. | 250/362 |

OTHER PUBLICATIONS

N. Ricquier, et al., "Active Pixel CMOS Image Sensor with On-Chip Non-Uniformity Correction", IEEE Workshop on Charge-Coupled Devices and Advanced Image Sensors, Apr. 1995.
M. Cohen, et al., "CMOS Imager Non-Uniformity Correction Using Floating-Gate Adaptation", in "CMOS Imagers: From Phototransduction to Image Processing", Chapter 6, pp. 203-221, 2004.
U.S. Appl. No. 12/859,115, filed Aug. 18, 2010, Applicant: Francisco Imai.
U.S. Appl. No. 12/871,826, filed Aug. 30, 2010, Applicant: Francisco Imai.

* cited by examiner

*Primary Examiner* — James Hannett
(74) *Attorney, Agent, or Firm* — Fitzpatrick, Cella, Harper & Scinto (57) ABSTRACT

Compensation is performed for an image capture device which includes an image sensor which has a tunable spectral response and which is tunable in accordance with a capture mask. The compensation is for spatial non-uniformity in color sensitivity of the image sensor. A default capture mask is applied to the image sensor, and a sample image is captured using the image sensor tuned by the default capture mask. Color of the sample image is analyzed to identify spatial non-uniformity in color sensitivity of the image sensor. A compensation capture mask is constructed. The compensation capture mask is constructed using calculations based on the identified spatial non-uniformity so as to compensate for spatial non-uniformity in color sensitivity of the image sensor. The compensation capture mask is stored in a memory of the image capture device for application of the compensation capture mask to the image sensor.

49 Claims, 5 Drawing Sheets

IMAGE SENSOR COMPENSATION

FIELD

The present disclosure relates to compensation for non-uniformity in an image sensor.

BACKGROUND

In the field of image sensors, because of factors such as manufacturing tolerances, impurities and environmental conditions that might lead to irregularities in parts of the sensor, the image sensor might not produce a uniform output signal, even when subjected to a uniform stimulus.

To compensate for non-uniformities, a manual calibration of the image sensor is sometimes performed. In this calibration process, corrective parameters such as bias and scale factor are derived. In use during image capture, the corrective parameters are applied to raw output from the image sensor, so as to obtain corrected output signals in which non-uniformities are reduced.

SUMMARY

One problem with the above method is that such manual calibration must be performed post-capture of the image data. Thus, the raw sensor output is already incorrectly non-uniform, and contains defects and errors. Accordingly, any further adjustment of the image sensor and/or processing of the image itself must start from a raw image signal which already contains such defects and errors.

The disclosure herein addresses the foregoing and compensates for spatial non-uniformity in color sensitivity of an image sensor by generating a compensation capture mask for a tunable image sensor prior to image capture, and by applying the mask at the time of image capture.

Thus, in an example embodiment described herein, compensation is performed for an image capture device which includes an image sensor which has a tunable spectral response and which is tunable in accordance with a capture mask. The compensation is for spatial non-uniformity in color sensitivity of the image sensor. A default capture mask is applied to the image sensor, and a sample image is captured using the image sensor tuned by the default capture mask. Color of the sample image is analyzed to identify spatial non-uniformity in color sensitivity of the image sensor. A compensation capture mask is constructed for application to the image sensor. The compensation capture mask is constructed using calculations based on the identified spatial non-uniformity so as to compensate for spatial non-uniformity in color sensitivity of the image sensor. The compensation capture mask is stored in a memory of the image capture device for application of the compensation capture mask to the image sensor.

By generating a compensation capture mask for a tunable image sensor prior to image capture and applying the mask at the time of image capture to compensate for spatial non-uniformity in color sensitivity of the image sensor, it is ordinarily possible to provide improved compensation, because the mask addresses non-uniformities while capturing the raw image signal. Thus, any further adjustment of the image sensor and/or processing of the image begins from a raw image signal with reduced defects and errors.

This brief summary has been provided so that the nature of this disclosure may be understood quickly. A more complete understanding can be obtained by reference to the following detailed description and to the attached drawings.

DETAILED DESCRIPTION

In the following example embodiments, there is described a digital camera which may be a digital still camera or a digital video camera. It is understood, however, that the following description encompasses arbitrary arrangements which can incorporate or utilize imaging assemblies having a spectral response which is tunable in accordance with a capture parameter, for instance, a data processing apparatus having an image sensing function (e.g., a personal computer) or a portable terminal having an image sensing function (e.g., a mobile telephone).

Figure 1A:
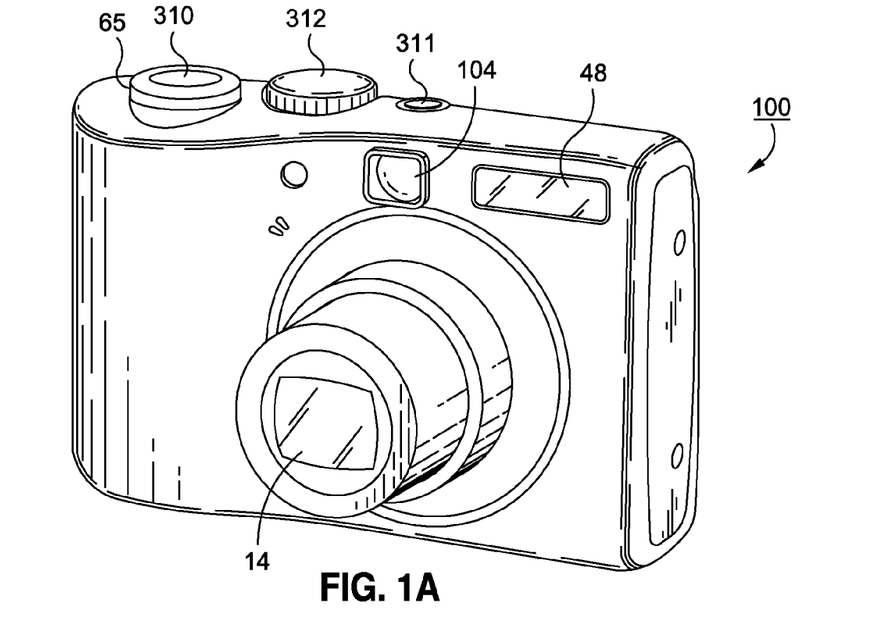
FIGS. 1A and 1B are views depicting an external appearance of an image capture device according to an example embodiment.
Figure 1B:
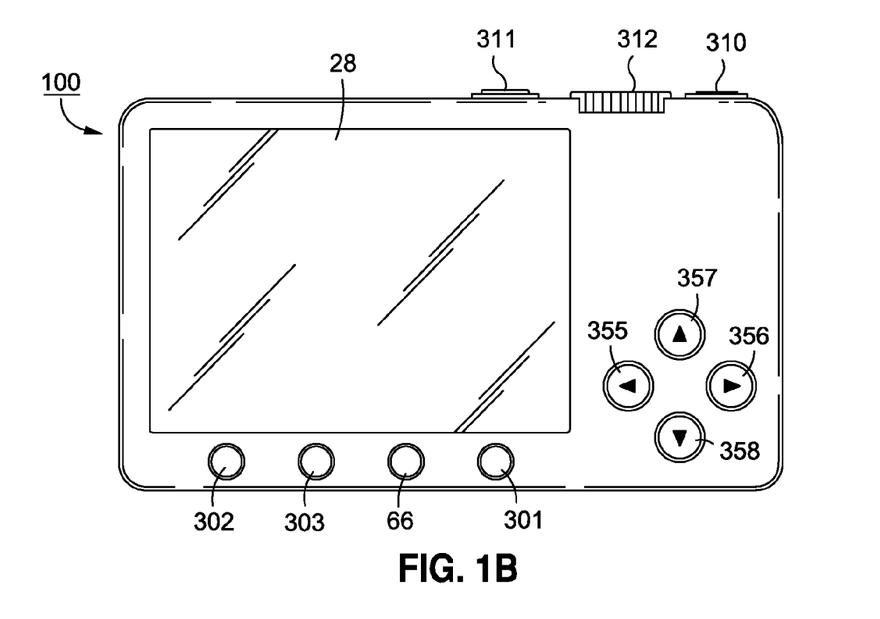

FIGS. 1A and 1B are views showing an example of an external appearance of an image capture device 100 according to an example embodiment. Note in these figures, some components are omitted for conciseness. A user operates buttons and switches 301 to 311 for turning ON/OFF the power of the digital camera 100, for setting, changing or confirming the shooting parameters, for confirming the status of the camera, and for confirming shot images.

Optical finder 104 is a viewfinder, through which a user can view a scene to be captured. In this embodiment optical finder 104 is separate from image display unit 28, but in some embodiments image display unit 28 may also function as a viewfinder.

Flash (flash emission device) 48 is for emitting auxiliary light to illuminate a scene to be captured, if necessary.

Image sensor 14, hidden inside the camera, is an image sensor which converts an optical image into an electrical signal. In this embodiment, image sensor 14 is a multi-spectral image sensor with a spectral response which is tunable in accordance with a capture parameter. Image sensor 14 will be described more fully below with respect to FIG. 2A.

The power button 311 is provided to start or stop the digital camera 100, or to turn ON/OFF the main power of the digital camera 100. The menu button 302 is provided to display the setting menu such as shooting parameters and operation modes of the digital camera 100, and to display the status of the digital camera 100. The menu includes selectable items or items whose values are variable.

A delete button 301 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 303 is pressed for selecting a mode or an item. When the enter button 303 is pressed, a system controller 50 (shown in FIG. 2A) sets the mode or item selected at this time. The display ON/OFF button 66 is used for selecting displaying or non-displaying of photograph information regarding the shot image, and for switching the image display unit 28 to be functioned as an electronic view finder.

A left button 355, a right button 356, an up button 357, and a down button 358 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification).

A recording/playback selection switch 312 is used for switching a recording mode to a playback mode, or switching a playback mode to a recording mode. Note, in place of the above-described operation system, a dial switch may be adopted or other operation systems may be adopted.

Figure 2A:
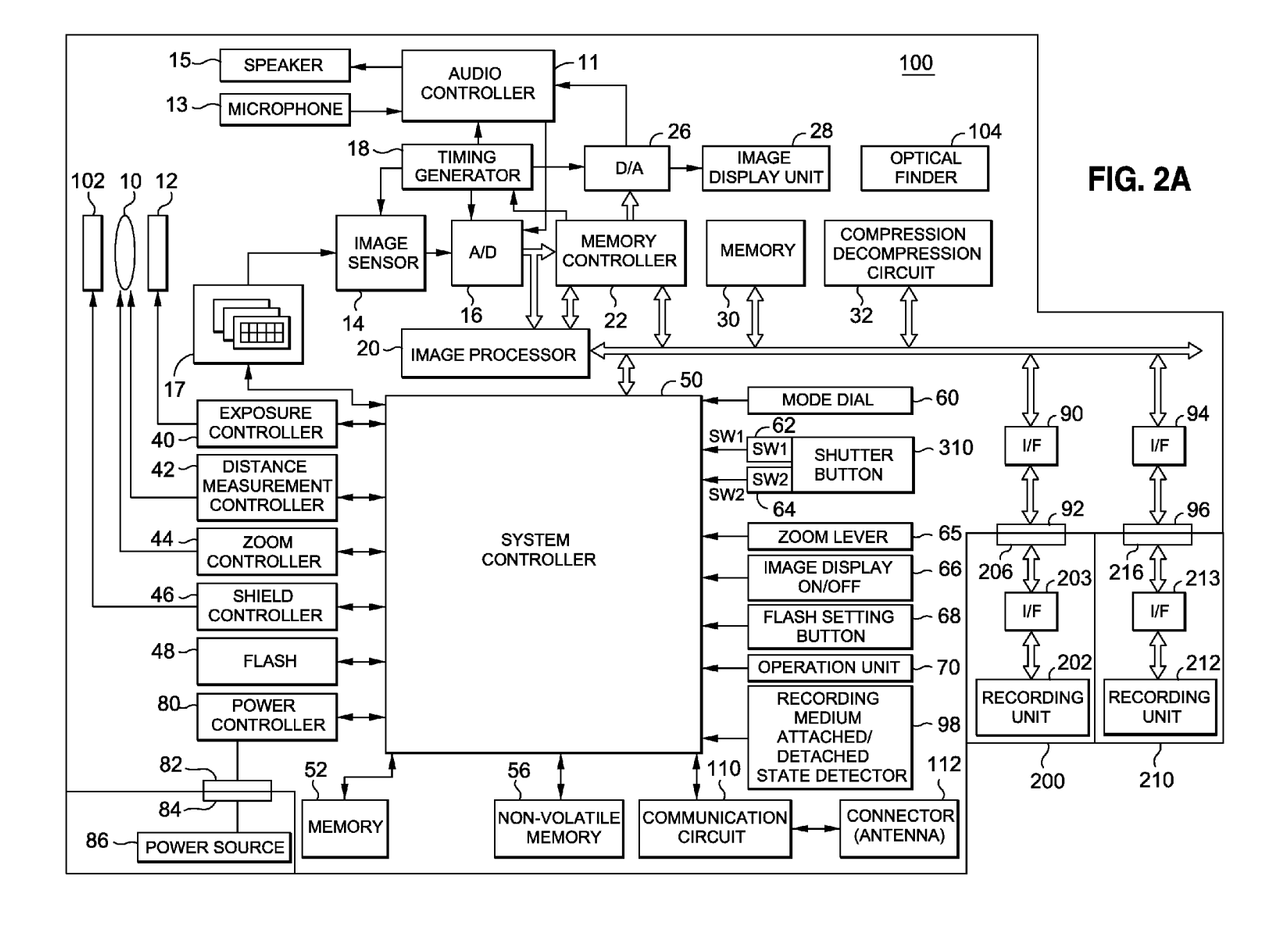
FIGS. 2A and 2B are detailed block diagrams for explaining the internal architecture of the image capture device shown in FIG. 1 according to an example embodiment.

FIG. 2A is a block diagram showing an example of the arrangement of the digital camera 100 as an image capturing device according to this embodiment. Referring to FIG. 2A, reference numeral 10 denotes an imaging lens; 12, a shutter having an aperture function; and 14, an image sensor which has a spectral response which is tunable in accordance with a capture parameter, and which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

In FIG. 2A, an imaging assembly is comprised of image sensor 14 and associated optics, such that in some embodiments the imaging assembly is comprised of image sensor 14 and lens 10.

The optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object in a scene that goes through the optical system (image sensing lens) 10 passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and the system controller 50.

Image sensor 14 is an image sensor which has a spectral response which is tunable in accordance with a capture parameter 17. In one example, image sensor 14 outputs five or more channels of color information for each pixel, including a red-like channel, a green-yellow-like channel, a green-like channel, a blue-green-like channel, and a blue-like channel. The precise nature of the spectral responsivity of image sensor 14 is controlled via capture parameter 17. In this embodiment, capture parameter 17 may be comprised of multiple spatial masks, with one mask each for each channel of information output by image sensor 14. Thus, in this example, where image sensor 14 outputs five or more channels, capture parameter 17 includes a spatial mask DR for the red-like channel of information, a spatial mask DGY for the green-yellow-like channel of information, a spatial mask DG for the green-like channel of information, a spatial mask DBG for the blue-green-like channel of information and a spatial mask DB for the blue-like channel of information. Each spatial mask comprises an array of control parameters corresponding to pixels or regions of pixels in image sensor 14. The spectral responsivity of each pixel, or each region of plural pixels, is thus tunable individually and independently of other pixels or regions of pixels. In that regard, Image sensor 14 may be comprised of a transverse field detector (TFD) sensor, and spatial masks DR, DGY, DG, DBG and DB may correspond to voltage biases applied to control electrodes of the TFD sensor.

In the embodiment herein, the image sensor 14 is not preceded by a color filter array (CFA). A color filter array is one method to address spatial non-uniformities. An example of such a CFA is described in U.S. Pat. No. 6,226,034 (Katayama), the contents of which are incorporated by reference herein. However, the use of a CFA leads to a number of disadvantages. For example, CFAs often have low sensitivity, so a significant amount of signals (data) can be lost. In that regard, the inclusion of any filter necessarily decreases the signal-to-noise ratio by filtering the amount of light incident on the image sensor. Moreover, implementing a CFA for each pixel can be prohibitively expensive and may not be physically possible, particularly in smaller cameras. Thus, according to the present embodiment, the image sensor 14 is not preceded by a CFA.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
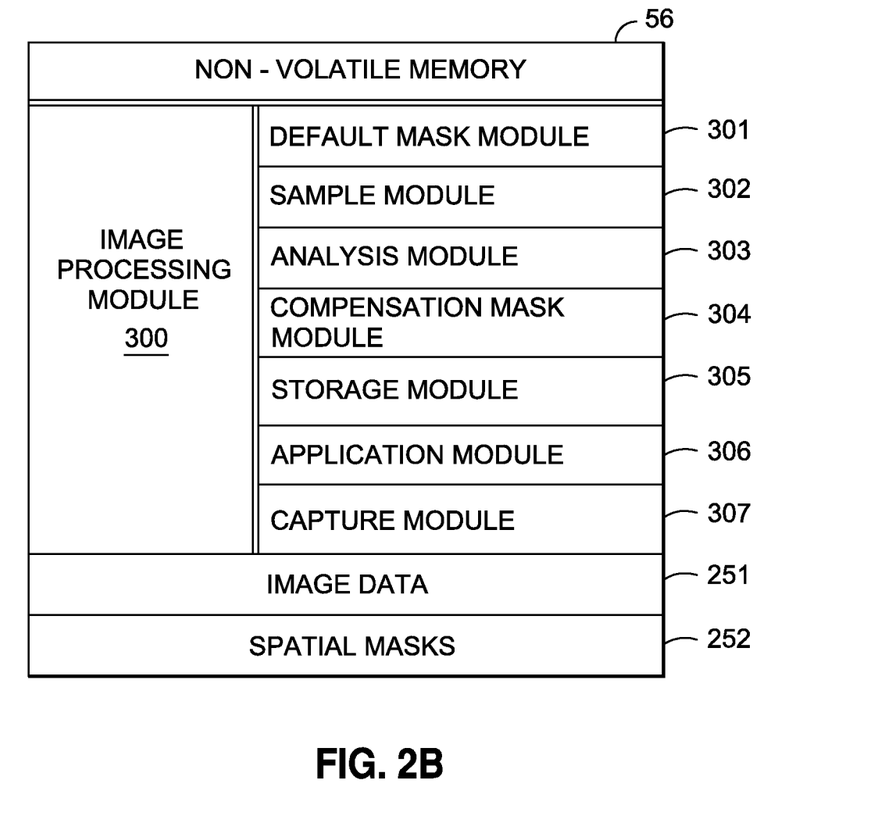

In particular, as shown in FIG. 2B, non-volatile memory 56 is an example of a non-transitory computer-readable memory medium, having retrievably stored thereon image capture module 300 as described herein. According to this example embodiment, the image capture module 300 includes at least a default mask module 301 for applying a default capture mask to the image sensor, a sample module 302 capturing a sample image using the image sensor tuned by the default capture mask, and an analysis module 303 for analyzing color of the sample image to identify spatial non-uniformity in color sensitivity of the image sensor. Image capture module 300 further includes a compensation mask module 304 for constructing a compensation capture mask for application to the image sensor. The compensation capture mask is constructed using calculations based on the identified spatial non-uniformity so as to compensate for spatial non-uniformity in color sensitivity of the image sensor. Storage module 305 stores the compensation capture mask in a memory of the image capture device for application of the compensation capture mask to the image sensor. In some embodiments, such as that shown in FIG. 2B, image capture module 300 may also include application module 306 for applying the compensation capture mask to the image sensor, and a capture module 307 for capturing and storing an image of a scene using the image sensor tuned by the compensation capture mask. These modules will be discussed in more detail below with respect to FIG. 3.

Additionally, as shown in FIG. 2B, non-volatile memory 56 also includes image data 251, which includes image data from a scene. Non-volatile memory may also store capture parameter(s) 17 for application to image sensor 14 so as to control spectral responsivity of the imaging assembly. In this embodiment, such capture parameters comprise spatial masks 252, which control spectral responsivity of the image sensor so as to permit pixel-by-pixel or region-by-region control of spectral responsivity, independently of other pixels or regions. Thus, for example, a compensation capture mask can be stored in a memory of the image capture device such as non-volatile memory 56, for application of the compensation capture mask to the image sensor.

Reference numeral 50 denotes a system controller, which controls the entire digital camera 100. The system controller 50 executes programs recorded in the aforementioned non-volatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensor 14, and image data written in the memory 30 through the A/D converter 16 and the memory controller 22 is recorded in the recording medium 200 or 210.

Note that the digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

Figure 3:
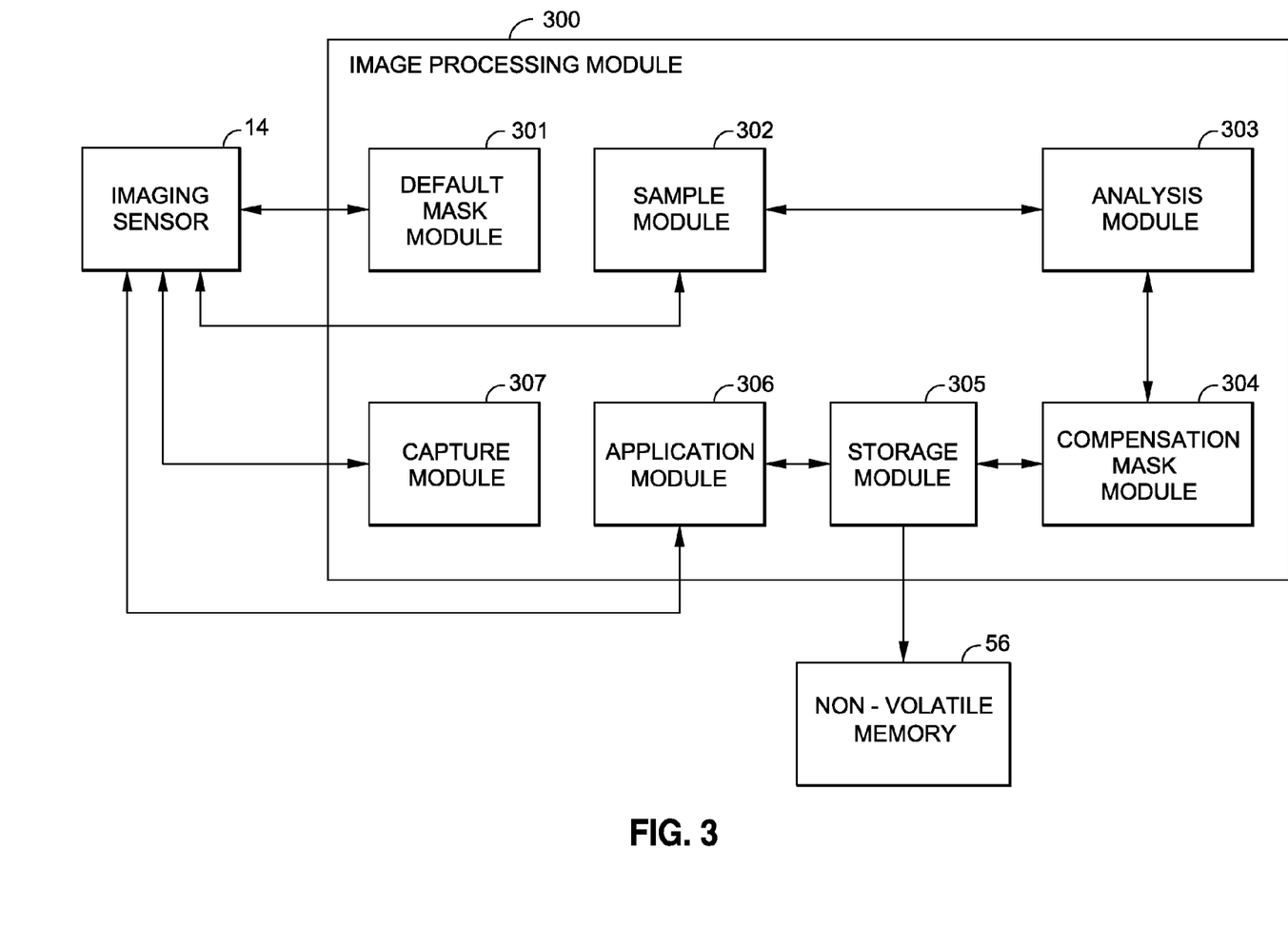
FIG. 3 is a view for explaining an image processing module according to one example embodiment.

FIG. 3 is a view for explaining an image processing module according to one example embodiment. As previously discussed with respect to FIG. 2B, image processing module 300 comprises computer-executable process steps stored on a non-transitory computer-readable storage medium, such as non-volatile memory 56. More or less modules may be used, and other architectures are possible.

As shown in FIG. 3, image processing module 300 includes at least default mask module 301. Default mask module 301 communicates with image sensor 14 to applying a default capture mask to image sensor 14. Image processing module 300 also includes sample module 302, which also communicates with image sensor 14, and which captures a sample image using the image sensor tuned by the default capture mask. Analysis module 303 analyzes color of the sample image captured by sample module 302 to identify spatial non-uniformity in color sensitivity of the image sensor. Compensation mask module 304 constructs a compensation capture mask for application to the image sensor. The compensation capture mask is constructed using calculations based on the identified spatial non-uniformity, so as to compensate for spatial non-uniformity in color sensitivity of image sensor 14. Storage module 305 stores the compensation capture mask in a memory of the image capture device for application of the compensation capture mask to the image sensor. In that regard, the compensation capture mask constructed by compensation mask module 304 (and/or the default mask applied by default mask module 301) can be stored in nonvolatile memory 56, for example as spatial masks 252 shown in FIG. 2B.

In the embodiment shown in FIG. 3, image capture module 300 further includes application module 306, which applies the compensation capture mask to the image sensor 14, and capture module 307, which captures and stores an image of a scene using image sensor 14 tuned by the compensation capture mask.

Figure 4:
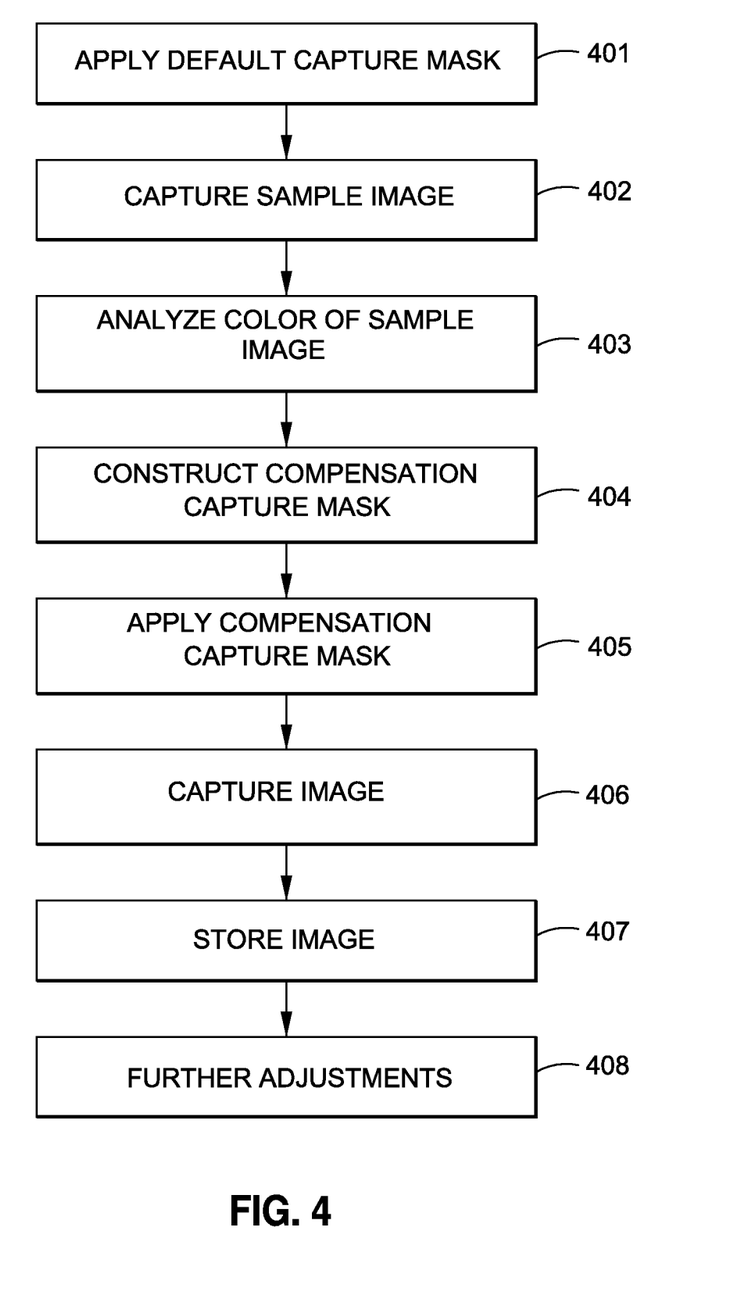
FIG. 4 is a flow diagram for explaining processing in the image capture device shown in FIG. 1 according to an example embodiment.

FIG. 4 is a flow diagram for explaining processing in the image capture device shown in FIG. 1 according to an example embodiment.

Briefly, in FIG. 4, compensation is performed for an image capture device which includes an image sensor which has a tunable spectral response and which is tunable in accordance with a capture mask. The compensation is for spatial non-uniformity in color sensitivity of the image sensor. A default capture mask is applied to the image sensor, and a sample image is captured using the image sensor tuned by the default capture mask. Color of the sample image is analyzed to identify spatial non-uniformity in color sensitivity of the image sensor. A compensation capture mask is constructed. The compensation capture mask is constructed using calculations based on the identified spatial non-uniformity so as to compensate for spatial non-uniformity in color sensitivity of the image sensor. The compensation capture mask is stored in a memory of the image capture device for application of the compensation capture mask to the image sensor.

In step 401, a default capture mask is applied to the image sensor. More specifically, for example, default capture setting(s) are applied to the tunable image sensor 14 for setting the spectral response of the tunable imaging assembly to a predesignated default setting. In this example embodiment, the default capture settings comprise the default capture mask. For example, the default capture mask can be given by electronic voltages that have some assumptions about illumination and material properties of the scene, and is usually a pre-designated setting determined in advance such as by a calibration procedure that is made in the imaging system assembly line.

In step 402, a sample image is captured using the image sensor tuned by the default capture mask. In one example, the captured sample image comprises an image of a scene which includes a perfectly diffuse illumination which fills the field of the image sensor.

For example, the perfectly diffuse illumination can comprise a uniform gray card illuminated by a diffuse illumination. A gray card is a flat object of a neutral gray color that derives from a flat reflectance spectrum. Its apparent brightness (and exposure determination) generally does not depend on its orientation relative to the light source. By placing a gray card in the scene to be photographed, oriented at a defined angle relative to the direction of the incident light, and taking a reading from it with a reflected light meter, the photographer can be assured of consistent exposures across photographs.

Alternatively, the perfectly diffuse illumination can comprise an integration sphere. An integration sphere is a sphere coated with a highly reflective substance, providing substantial diffusion of illumination. The image sensor does not image the sphere directly, but rather images illumination "bounced off" the sphere.

In step 403, color of the sample image is analyzed to identify spatial non-uniformity in color sensitivity of the image sensor. In that regard, in analyzing color of the sample image, spatial non-uniformity in color sensitivity can be identified by comparing a value of each pixel against a combination of values of other pixels.

If there were absolutely no non-uniformities in the image sensor, all pixel signals from the sample image would be the same. Of course, this is generally not the case, as usually there are non-uniformities in the sensor, i.e., more light being captured in center pixels, etc.

Accordingly, in step 404, a compensation capture mask is constructed for application to the image sensor. The compensation capture mask is constructed using calculations based on the identified spatial non-uniformity so as to compensate for spatial non-uniformity in color sensitivity of the image sensor.

In one example, each channel of the image sensor is averaged, and spatial non-uniformity in color sensitivity is identified at deviations from the average of each channel. Then, in constructing the compensation capture mask, signals from each channel are normalized to the average value for each such channel.

For example, for a red channel, assume pixels $R01$, $R02, \ldots R0n$. The average value is $R_{average}=(R01+R02+\ldots+Ron)/n$. The compensation value for pixel $R01$ is $R01_{comp}=R_{average}/R01$, the compensation value for pixel $R02$ is $R02_{comp}=R_{average}/R02 \ldots R0n_{comp}=R_{average}/R0n$.

Other methods of constructing the compensation capture mask are possible. For example, the compensation capture mask need not be based on the average of each channel, but could instead be based on, for example, the median value, a percentile of the pixel values (e.g., the $60^{th}$ percentile), and so on.

The constructed mask indicates bias voltages to tune each pixel. For example, if a pixel or region is too dark, the bias voltage of that pixel or region may be increased to increase sensitivity, and if the pixel or region is too bright, the bias voltage of that pixel or region could be reduced to decrease sensitivity. The necessary bias voltage is determined by the difference between the current voltage and the compensation value for that pixel. Thus, for example, Rcurrent*(V)=Rcomp. In that regard, a lookup table (LUT) may be used to store the bias voltages necessary to get from a current value for a pixel to a compensated value for that pixel.

As mentioned above, the compensation capture mask can be stored in a memory of the image capture device, such as non-volatile memory 56, for application of the compensation capture mask to the image sensor.

In step 405, the compensation capture mask is applied to the image sensor. Thus, the bias voltages for each pixel are adjusted in accordance with the capture mask in order to adjust for spatial non-uniformity in color sensitivity of the pixels.

In step 406, an image of a scene is captured using the image sensor tuned by the compensation capture mask.

In step 407, the captured image is stored. For example, the captured image could be stored as image data 251 on non-volatile memory 56, as shown in FIG. 2B. Of course, the captured image could also be stored elsewhere, including off-site from the camera, provided that the image capture device is able to communicate with and transmit the image data to such remote sites.

In step 408, further adjustments are performed on the captured image data, using the scene captured by the image sensor tuned by the compensation capture mask. For example, further correction could be performed to further compensate for different illumination, as discussed below. In another example, the captured image data could be adjusted as desired by an artist or photographer. Various other applications and adjustments are possible, but for purposes of conciseness are not described further herein.

In one embodiment, image sensor 14 is preceded by imaging optics, and the compensation method also compensates for spatial non-uniformity in color sensitivity introduced by the imaging optics. For example, the imaging optics can be exchangeable with other such imaging optics, such as different lenses or different flash emission devices, and a separate compensation capture mask can be provided for each of such imaging optics. The above process can be used to construct and apply a compensation capture mask to compensate for spatial non-uniformities in the color sensitivity of each respective set of imaging optics.

In another embodiment, a separate compensation capture mask can be provided to compensate for spatial non-uniformity in illumination of the scene. For example, external lighting conditions often may cause non-uniformities in how a scene is lit, even in controlled settings such as professional photography. By applying the above-described process to compensate for such spatial non-uniformities, it is ordinarily possible to significantly reduce the amount of time necessary for processing the image.

In still another embodiment, a compensation capture mask can be retrieved from a memory. The compensation capture mask is constructed so as to compensate for spatial non-uniformity in color sensitivity of the image sensor. The compensation capture mask is applied to the image sensor, and an image of a scene is captured and stored using the image sensor tuned by the compensation capture mask.

It is also possible to use the above-described processes to compensate for multiple situations causing non-uniformities, e.g., to compensate both for spatial non-uniformity in color sensitivity introduced by the imaging optics as well as spatial non-uniformity in illumination of the scene. For example, a compensation capture mask could be constructed to compensate for the imaging optics, and a second compensation capture mask could be constructed to correct for non-uniformities in illumination.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

By generating a compensation capture mask for a tunable image sensor prior to image capture and applying the mask at the time of image capture to compensate for spatial non-uniformity in color sensitivity of the image sensor, it is ordinarily possible to provide improved compensation, because the mask addresses non-uniformities while capturing the raw image signal. Thus, any further adjustment of the image sensor and/or processing of the image begins from a raw image signal with reduced defects and errors.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A compensation method for an image capture device which includes an image sensor which has a physical characteristic of a tunable spectral response and which is tunable in accordance with a capture mask, wherein the method compensates for spatial non-uniformity in color sensitivity of the image sensor, the method comprising:
    applying a default capture mask to the image sensor;
    capturing a sample image using the image sensor tuned by the default capture mask;
    analyzing color of the sample image to identify spatial non-uniformity in color sensitivity of the image sensor;
    constructing a compensation capture mask for application to the image sensor, wherein the compensation capture mask is constructed using calculations based on the identified spatial non-uniformity so as to compensate for spatial non-uniformity in color sensitivity of the image sensor per pixel or region by adjusting light that enters the image sensor; and
    storing the compensation capture mask in a memory of the image capture device for application of the compensation capture mask to the image sensor.

2. The compensation method according to claim 1, further comprising:
    applying the compensation capture mask to the image sensor; and
    capturing and storing an image of a scene using the image sensor tuned by the compensation capture mask.

3. The compensation method according to claim 1, wherein in analyzing color of the sample image, spatial non-uniformity in color sensitivity is identified by comparing a value of each pixel against a combination of values of other pixels.

4. The compensation method according to claim 3, wherein in analyzing color of the sample image, each channel of the image sensor is averaged and spatial non-uniformity in color sensitivity is identified at deviations from the average of each channel.

5. The compensation method according to claim 4, wherein in constructing the compensation capture mask, signals from each channel are normalized to the average value for each such channel.

6. The compensation method according to claim 1, wherein the captured sample image comprises an image of a scene which includes a perfectly diffuse illumination which fills the field of the image sensor.

7. The compensation method according to claim 6, wherein the perfectly diffuse illumination comprises a uniform gray card illuminated by a diffuse illumination.

8. The compensation method according to claim 6, wherein the perfectly diffuse illumination comprises an integration sphere.

9. The compensation method according to claim 1, wherein in the image capture device, the image sensor is not preceded by a color filter array.

10. The compensation method according to claim 1, wherein in the image capture device, the image sensor is preceded by imaging optics, and wherein the compensation method also compensates for spatial non-uniformity in color sensitivity introduced by the imaging optics.

11. The compensation method according to claim 10, wherein the imaging optics are exchangeable with other such imaging optics, and wherein a separate compensation capture mask is provided for each of such imaging optics.

12. The compensation method according to claim 1, wherein a separate compensation capture mask is provided to compensate for spatial non-uniformity in illumination of the scene.

13. An image capture device which includes an image sensor which has a physical characteristic of a tunable spectral response and which is tunable in accordance with a capture mask, comprising:
    a computer-readable memory constructed to store computer-executable process steps; and
    a processor constructed to execute the computer-executable process steps stored in the memory;
    wherein the process steps stored in the memory cause the processor to:
    apply a default capture mask to the image sensor;
    capture a sample image using the image sensor tuned by the default capture mask;
    analyze color of the sample image to identify spatial non-uniformity in color sensitivity of the image sensor;
    construct a compensation capture mask for application to the image sensor, wherein the compensation capture mask is constructed using calculations based on the identified spatial non-uniformity so as to compensate for spatial non-uniformity in color sensitivity of the image sensor per pixel or region by adjusting light that enters the image sensor; and
    store the compensation capture mask in a memory of the image capture device for application of the compensation capture mask to the image sensor.

14. The device according to claim 13, wherein the process steps further cause the processor to:
    apply the compensation capture mask to the image sensor; and capture and store an image of a scene using the image sensor tuned by the compensation capture mask.

15. The device according to claim 13, wherein in analyzing color of the sample image, spatial non-uniformity in color sensitivity is identified by comparing a value of each pixel against a combination of values of other pixels.

16. The device according to claim 15, wherein in analyzing color of the sample image, each channel of the image sensor is averaged and spatial non-uniformity in color sensitivity is identified at deviations from the average of each channel.

17. The device according to claim 16, wherein in constructing the compensation capture mask, signals from each channel are normalized to the average value for each such channel.

18. The device according to claim 13, wherein the captured sample image comprises an image of a scene which includes a perfectly diffuse illumination which fills the field of the image sensor.

19. The device according to claim 18, wherein the perfectly diffuse illumination comprises a uniform gray card illuminated by a diffuse illumination.

20. The device according to claim 18, wherein the perfectly diffuse illumination comprises an integration sphere.

21. The device according to claim 13, wherein in the image capture device, the image sensor is not preceded by a color filter array.

22. The device according to claim 13, wherein in the image capture device, the image sensor is preceded by imaging optics, and wherein the compensation method also compensates for spatial non-uniformity in color sensitivity introduced by the imaging optics.

23. The device according to claim 22, wherein the imaging optics are exchangeable with other such imaging optics, and wherein a separate compensation capture mask is provided for each of such imaging optics.

24. The device according to claim 13, wherein a separate compensation capture mask is provided to compensate for spatial non-uniformity in illumination of the scene.

25. An image processing module for use in an image capture device which includes an image sensor which has a physical characteristic of a tunable spectral response and which is tunable in accordance with a capture mask, wherein the module compensates for spatial non-uniformity in color sensitivity of the image sensor, the module comprising:
a default mask module for applying a default capture mask to the image sensor;
a sample module for capturing a sample image using the image sensor tuned by the default capture mask;
an analysis module for analyzing color of the sample image to identify spatial non-uniformity in color sensitivity of the image sensor;
a compensation mask module for constructing a compensation capture mask for application to the image sensor, wherein the compensation capture mask is constructed using calculations based on the identified spatial non-uniformity so as to compensate for spatial non-uniformity in color sensitivity of the image sensor per pixel or region by adjusting light that enters the image sensor; and
a storage module for storing the compensation capture mask in a memory of the image capture device for application of the compensation capture mask to the image sensor.

26. The image processing module according to claim 25, further comprising:
an application module for applying the compensation capture mask to the image sensor; and
a capture module for capturing and storing an image of a scene using the image sensor tuned by the compensation capture mask.

27. The image processing module according to claim 25, wherein in analyzing color of the sample image, spatial non-uniformity in color sensitivity is identified by comparing a value of each pixel against a combination of values of other pixels.

28. The image processing module according to claim 27, wherein in analyzing color of the sample image, each channel of the image sensor is averaged and spatial non-uniformity in color sensitivity is identified at deviations from the average of each channel.

29. The image processing module according to claim 28, wherein in constructing the compensation capture mask, signals from each channel are normalized to the average value for each such channel.

30. The image processing module according to claim 25, wherein the captured sample image comprises an image of a scene which includes a perfectly diffuse illumination which fills the field of the image sensor.

31. The image processing module according to claim 30, wherein the perfectly diffuse illumination comprises a uniform gray card illuminated by a diffuse illumination.

32. The image processing module according to claim 30, wherein the perfectly diffuse illumination comprises an integration sphere.

33. The image processing module according to claim 25, wherein in the image capture device, the image sensor is not preceded by a color filter array.

34. The image processing module according to claim 25, wherein in the image capture device, the image sensor is preceded by imaging optics, and wherein the compensation method also compensates for spatial non-uniformity in color sensitivity introduced by the imaging optics.

35. The image processing module according to claim 34, wherein the imaging optics are exchangeable with other such imaging optics, and wherein a separate compensation capture mask is provided for each of such imaging optics.

36. The image processing module according to claim 25, wherein a separate compensation capture mask is provided to compensate for spatial non-uniformity in illumination of the scene.

37. A non-transitory computer-readable storage medium removably storing computer-executable process steps for causing a computer to perform a compensation method for an image capture device which includes an image sensor which has a physical characteristic of a tunable spectral response and which is tunable in accordance with a capture mask, wherein the method compensates for spatial non-uniformity in color sensitivity of the image sensor, the method comprising:
applying a default capture mask to the image sensor;
capturing a sample image using the image sensor tuned by the default capture mask;
analyzing color of the sample image to identify spatial non-uniformity in color sensitivity of the image sensor;
constructing a compensation capture mask for application to the image sensor, wherein the compensation capture mask is constructed using calculations based on the identified spatial non-uniformity so as to compensate for spatial non-uniformity in color sensitivity of the image sensor per pixel or region by adjusting light that enters the image sensor; and
storing the compensation capture mask in a memory of the image capture device for application of the compensation capture mask to the image sensor.

38. The computer-readable storage medium according to claim 37, wherein the method further comprises:
   applying the compensation capture mask to the image sensor; and
   capturing and storing an image of a scene using the image sensor tuned by the compensation capture mask.

39. The computer-readable storage medium according to claim 37, wherein in analyzing color of the sample image, spatial non-uniformity in color sensitivity is identified by comparing a value of each pixel against a combination of values of other pixels.

40. The computer-readable storage medium according to claim 39, wherein in analyzing color of the sample image, each channel of the image sensor is averaged and spatial non-uniformity in color sensitivity is identified at deviations from the average of each channel.

41. The computer-readable storage medium according to claim 40, wherein in constructing the compensation capture mask, signals from each channel are normalized to the average value for each such channel.

42. The computer-readable storage medium according to claim 37, wherein the captured sample image comprises an image of a scene which includes a perfectly diffuse illumination which fills the field of the image sensor.

43. The computer-readable storage medium according to claim 42, wherein the perfectly diffuse illumination comprises a uniform gray card illuminated by a diffuse illumination.

44. The computer-readable storage medium according to claim 42, wherein the perfectly diffuse illumination comprises an integration sphere.

45. The computer-readable storage medium according to claim 37, wherein in the image capture device, the image sensor is not preceded by a color filter array.

46. The computer-readable storage medium according to claim 37, wherein in the image capture device, the image sensor is preceded by imaging optics, and wherein the compensation method also compensates for spatial non-uniformity in color sensitivity introduced by the imaging optics.

47. The computer-readable storage medium according to claim 46, wherein the imaging optics are exchangeable with other such imaging optics, and wherein a separate compensation capture mask is provided for each of such imaging optics.

48. The computer-readable storage medium according to claim 37, wherein a separate compensation capture mask is provided to compensate for spatial non-uniformity in illumination of the scene.

49. A compensation method for an image capture device which includes an image sensor which has a physical characteristic of a tunable spectral response and which is tunable in accordance with a capture mask, comprising:
   retrieving a compensation capture mask from a memory, wherein the compensation capture mask is constructed so as to compensate for spatial non-uniformity in color sensitivity of the image sensor per pixel or region by adjusting light that enters the image sensor;
   applying the compensation capture mask to the image sensor; and
   capturing and storing an image of a scene using the image sensor tuned by the compensation capture mask.

* * * * *